United States Patent
Raju

Patent Number: 5,118,783
Date of Patent: Jun. 2, 1992

[54] CHAIN-STOPPED UNSATURATED POLYESTER RESINS

[75] Inventor: Katari S. Raju, Jacksonville, Fla.

[73] Assignee: Reichhold Chemicals, Inc., Durham, N.C.

[21] Appl. No.: 581,032

[22] Filed: Sep. 12, 1990

[51] Int. Cl.$^5$ .................. C08G 63/02; C08G 63/18; G08F 20/00

[52] U.S. Cl. .................................... 528/274; 525/440; 525/445; 525/447; 528/193; 528/194; 528/272; 528/306

[58] Field of Search ............... 528/193, 194, 272, 274, 528/306; 525/440, 445, 447

[56] References Cited

U.S. PATENT DOCUMENTS

| | | | |
|---|---|---|---|
| T959,005 | 1/1977 | Davis et al. | 264/540 |
| 4,554,329 | 11/1985 | Sinker et al. | 528/272 |

*Primary Examiner*—John Kight, III
*Assistant Examiner*—T. Mosley
*Attorney, Agent, or Firm*—Rodman & Rodman

[57] ABSTRACT

A monofunctional alcohol or acid is used to chain stop a condensation reaction for preparing a low molecular weight unsaturated polyester resin. The monofunctional acid removes terminal hydroxy groups and replaces them with hydrocarbon groups. The monofunctional alcohol removes terminal carboxy groups and replaces them with hydrocarbon groups. The resulting polyester resins having improved hydrolytic stability. These chain stopped unsaturated polyester resins can be further modified with hydroxy acrylates, other hydroxy terminated polyesters, and diisocyanates to produce resins with excellent water resistance and physical properties for various applications, such as marble/onyx resins, sheet molding compounds, bulk molding compounds and resin transfer molding resins, gel coats, and bowling ball resins.

18 Claims, No Drawings

CHAIN-STOPPED UNSATURATED POLYESTER RESINS

BACKGROUND OF THE INVENTION

1. Field of the Invention

This invention relates generally to unsaturated polyester resins and, in particular, to low molecular weight unsaturated polyester resins that are chain-stopped with a monofunctional alcohol or acid.

2. Description of the Prior Art

In general, unsaturated polyesters are polymers having structural units linked by ester groupings. Such polymers can be obtained by the condensation of carboxylic acids with polyhydric alcohols in accordance with the following equation:

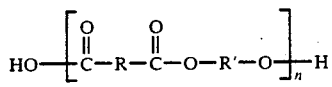

wherein R is the residual or remaining portion of the reactive molecule from any anhydride or dibasic acid after excluding carboxylic groups; R' is the residual from any glycol; and n is the repeating unit in the polymer chain. Most often with unsaturated polyesters, some or all of residual R is CH=CH, which is commonly derived from maleic anhydride or fumaric acid.

A typical low molecular weight unsaturated polyester can be produced by the reaction of maleic anhydride with diethylene glycol to give the following structure:

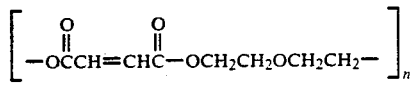

Alternatively, other carboxylic acids or anhydrides, such as fumaric acid, and glycols, such as propylene glycol, can be used. Typical low molecular weight unsaturated polyesters are in the form of a viscous oil having a molecular weight of about 2000 to 4000.

Low molecular weight unsaturated polyesters will crosslink in the presence of a peroxide by copolymerization with styrene or other vinyl monomers. Unsaturated maleic groups copolymerize in a 1:2 or 1:3 ratio with styrene. Several styrene molecules will react to join two ester chains together to yield an insoluble crosslinking structure.

Commercially available intermediate unsaturated polyesters usually contain about 30% styrene or other vinyl monomers. Copolymerization starts with the addition of a peroxide or other free radical catalyst and a metal dryer.

The copolymerization and crosslinking of polyesters is well known. For example, U.S. Pat. No. 3,376,273 to Masters et al relates to a process for preparing saturated polyesters which have utility in the textile field. In this process, difunctional polymer forming reactants such as dibasic acid anhydrides and monoepoxides are combined in the presence of a polyfunctional nucleus forming compound, which acts as an initiator. The initiator reacts with the monoepoxide to form a hydroxyl group or with the anhydride to form a half ester or with both.

Masters discloses the use of monofunctional chain stoppers to prevent functional groups from forming three dimensional structures. These monofunctional chain stoppers permit formation of high molecular weight thermoplastic resins from polyfunctional reactants.

U.S. Pat. No. 3,578,728 to Ehrhart et al discloses unsaturated polyester resins containing 50 mole percent of one or more dihydric alcohols and 50 mole percent of one or more dicarboxylic acids or anhydrides. Small amounts of monofunctional or polyfunctional acids or alcohols, or mixtures may be used to form the polyester resin. Larger amounts may be used if the functionality of the acid and/or alcohol mixture is maintained substantially about two.

U.S. Pat. No. 3,657,191 to Titzmann et al discloses a process for producing linear polyesters with improved stability by reacting the polyesters with ethylene carbonate or monofunctional glycidyl ether, melting the polyester and melt spinning the polyester.

Numerous processes for endcapping polyesters to improve their properties are also known. U.S. Pat. No. 4,200,731 to Massey et al relates to polyesters having molecular weights averaging from about 14,000 to 75,000, preferably from about 34,000 to 42,000. These polyesters are endcapped with benzoyl-lactams or substituted benzoylphthalimides.

U.S. Pat. No. 4,267,288 to Burkhart et al relates to hydroxy-terminated polyester urethanes endcapped with dicarboxylic acids or anhydrides to provide an acid capped polyester urethane. The acid capped chains are extended using epoxides to form epoxy-polyester-urethane block copolymers.

U.S. Pat. No. 4,379,895 to Frerking, Jr. et al discloses polyester resins having low intrinsic viscosities which are capped using an aliphatic acid, a dimer acid, an aromatic acid, or an alkyl substituted aromatic acid containing at least two carboxylic groups.

Reactive monomers which are useful for modifying polyester and vinyl ester resins are also known. U.S. Pat. No. 4,486,582 to Hefner discloses such modifiers prepared by reacting (1) an aromatic compound containing a polymerizable ethylenically unsaturated group and an group containing a hydrogen atom reactive with an NCO or NCS group, (2) a compound having at least one oxyalkylene group and at least one group containing a hydrogen atom reactive with an NCO or NCS group and (3) a compound having an average of more than one NCO and/or NCS group per molecule.

Other polyester resin compositions with desirable properties have also been prepared. For example, U.S. Pat. No. 3,457,326 to Kienle discloses a synthetic elastomer formed from (1) a linear, saturated, hydroxy terminated polyester or polyether, (2) an organic diisocyanate without isocyanate reactive groups, (3) an ethylenically unsaturated chain terminating material with less than 20 carbon atoms and containing only one group reactive with isocyanate and (4) a urea linkage forming material with at least 2 active hydrogen atoms such as diamines, water, amino-alcohols or amino phenols. The polyester used has a molecular weight between about 1000 and 4000, an acid number of less than 6 and is obtained by esterification of dicarboxylic acids and anhydrides with glycol.

U.S. Pat. No. 4,390,662 to Ando et al discloses an unsaturated polyester having improved properties. The composition includes an unsaturated polyester, which is generally hard and fragile, and an unsaturated acrylic urethane. The acrylic urethane is prepared by the addition reaction of an hydroxyl terminated polymer, a polyisocyanate and a monohydroxylalkyl monoacrylate or monohydroxylalkyl monomethacrylate.

Polyester resins have found application in a wide variety of fields. U.S. Pat. No. 4,269,798 to Ives discloses the use of polyester resins to produce artificial marble and onyx. Ives introduces a heated, catalyzed synthetic resin and filler material into the conveying section of a mixer. The conveying section forces the resin and filler through a mixing section which kneads and shears the material to uniformly disperse the resin throughout the filler. The combined resin/filler material is then introduced into a mold for curing.

U.S. Pat. No. 4,433,070 to Ross et al relates to cultured onyx products and discloses a shaped structure having a polishable cultured onyx surface, cultured marble surface or similar mineral appearing surface. The surface has a predetermined hardness with a locally discontinuous phase intimately distributed in a visually distinguishable continuous phase.

U.S. Pat. No. 4,678,819 to Sasaki et al relates to artificial marble and discloses a polymer composition in which an inorganic substance and an organic polymer are firmly bound in one body with a vinyl compound. U.S. Pat. No. 4,829,103 to Oda et al discloses an onyx like artificial marble made from an unsaturated polyester resin composition and aluminum hydroxide.

U.S. Pat. No. 3,318,727 to Boenig et al relates to the treatment of polyester surfaces with mono-, di- or polyisocyanates to provide a hardened surface with improved wear resistance that is specifically applicable to the manufacture of bowling balls. The isocyanate treated surface is then crosslinked using water or a compound with a plurality of functional groups.

U.S. Pat. No. 3,411,781 to Rytina et al discloses a cover for a bowling ball comprising a thermosetting polyester resin mix incorporating a polyfunctional crosslinking agent such as a non-polymeric esterified polyol, preferably completely esterified with a carboxylic acid. The total polyester is dissolved in styrene and crosslinked using trimethylolpropane trimethacrylate.

U.S. Pat. No. 4,253,665 to Miller, Jr. et al discloses a bowling ball having a thin film deposited on the surface from within the ball. The thin film includes a rigid unsaturated polyester resin, a flexible unsaturated resin, a saturated polyester plasticizer, and additional sufficient catalysts and promoters to cause curing of the rigid and flexible unsaturated polyester resins into a strong durable ball without binding the plasticizer to the resins.

U.S. Pat. No. 4,822,849 to Vanderlaan relates to unsaturated polyester compositions suitable as a shell for bowling balls including an unsaturated polyester prepolymer and a copolymerizable vinyl monomer cured with a polyisocyanate, a peroxide catalyst and optionally, with a peroxide activator and urethane catalyst.

U.S. Pat. No. 4,551,491 to Panush relates to a coating composition comprising a thermoplastic or thermosetting resin material containing about 1 to 20% by weight of a pigment composition.

U.S. Pat. No. 4,609,706 to Bode et al relates to high solids coatings prepared from low molecular weight unsaturated urethane containing polymers by reacting a low molecular weight hydroxylated oligomer with a bifunctional reactive monomer containing both an ethylenically unsaturated moiety and at least one isocyanate functionality. Bode et al distinguishes "alkyd resins" which include unsaturated fatty acid modified polyesters and exclude unsaturated polyesters wherein the unsaturation results largely from an unsaturated diacid or anhydride such as maleic, fumaric and the like.

U.S. Pat. No. 3,794,501 to De Nio relates to an antifouling marine paint composition including a vinyl chloride-vinyl acetate copolymer, rosin gum, pigment, polyethylene polymer, cuprous oxide, tri-n-butyltin fluoride and volatile solvents.

U.S. Pat. No. 3,898,190 to Willey relates to a marine coating composition including a binder of chlorinated hydrocarbon rubber, rosin which is at least partially soluble in sea water, an inorganic plasticizer of tricresyl phosphate, chlorinated paraffins or phthalate ester, cuprous oxide and calcium carbonate pigments and a solvent.

U.S. Pat. No. 4,021,392 to Milne et al relates to a top coat paint for ships' hulls including a film forming copolymer with at least one triorgano tin salt, a water insoluble metalliferous pigment and a hydrophobic organic retarder. U.S. Pat. No. 4,168,174 to Mixan relates to use of p-Dithiino(2,3-b)pyrazine-2,3-dicarbonitrile or 1,3-Dithiolo(4,5-b)pyrazin-2-ylidene-propanedinitrile and mixtures as antifouling agents.

In spite of the wealth of prior art, low molecular weight unsaturated polyesters with good physical properties are not readily available. It is, therefore, an object of the invention to provide low molecular weight, low viscosity unsaturated polyester resins with good physical properties.

SUMMARY OF THE INVENTION

The present invention relates to unsaturated polyester resins with low molecular weights of about 300 to 2500 that are chain-stopped or endcapped with monofunctional alcohols or acids. These chain-stopped polyester resins can be used as coating materials or reinforcement materials. The chain-stopped resins can be modified by addition of a polyisocyanate and a hydroxy acrylate to prepare resins for marble, onyx, fiber glass reinforced products (FRP), laminates, sheet molding compounds (SMC) and resin transfer molding (RTM) applications. Alternatively, the chain-stopped resins can be modified by adding polyisocyanate, an hydroxy acrylate and a dicyclopentadiene based unsaturated polyester resin to produce a composition suitable for low profile marine applications.

DESCRIPTION OF THE PREFERRED EMBODIMENTS

In accordance with the present invention, low molecular weight unsaturated polyesters are prepared by the condensation of dicarboxylic acids or anhydrides with polyhydric alcohols in the presence of chain stopping monofunctional acids or alcohols.

Suitable carboxylic acids or anhydrides include adipic acid, phthalic acid, phthalic anhydride, terephthalic acid, isophthalic acid, hexahydrophthalic acid, hexahydrophthalic anhydride, trimelitic acid, trimelitic anhydride, maleic acid, maleic anhydride, fumaric acid, and the like, and mixtures thereof.

Suitable polyhydric alcohols include ethylene glycol, propylene glycol, diethylene glycol, dipropylene glycol, trimethylolpropane, trimethylol ethane, neopentyl glycol, pentaerythritol, glycerine, triethylene glycol, cyclohexane dimethanol, hexane diol, butylene glycol, and the like, and mixtures thereof.

The monofunctional chain-stopping acids and alcohols do not contain ethylenic unsaturation and include benzyl alcohol, benzoic acid, cyclohexanol, 2-ethyl hexanol, and the like, and mixtures thereof.

When a monofunctional acid is used, a terminal hydroxy group of the polyester is removed and replaced with a hydrocarbon group. When a monofunctional alcohol is used, a terminal carboxy group of the polyester is removed and replaced with a hydrocarbon group.

The carboxylic acids or anhydrides are generally used in amounts varying from about 50 to 98 mole %, preferably from about 80 to 95 mole % and more preferably, from about 85 to 95 mole % of the total acid composition.

The polyhydric alcohols are generally used in amounts varying from about 100 to 225 mole %, preferably from about 105 to 140 and more preferably from about 110 to 125 mole % of the total acid composition.

Monofunctional chain-stopping materials can generally be used in amounts varying from 2 to 50 mole % of the total acid or total polyhydric alcohols, preferably from about 5 to 30 mole %, and more preferably from about 5 to 20 mole %. The total acid comprises the first group of acids or anhydrides used to form the unsaturated polyester and the second group of acids or corresponding alcohols used to perform the chain stop operation.

To obtain a chain-stopping effect, the functionality of the chain-stopper must be less than two. If the functionality is 2 or greater, the polymer chain can extend in both directions, and there is no chain stopping effect. When the functionality is less than 2, the polymer cannot propagate in both directions, thereby effectuating the chain stopping effect.

For example, monofunctional benzyl alcohol or benzoic acid terminates one direction of the esterification reaction.

The chain stopped unsaturated polyester resins can be prepared in a single or two stage fusion cooking process. A solvent process wherein an azeotropic solvent, such as xylene is used to facilitate water removal can also be used.

The unsaturated polyester resins are prepared by condensing polyols and polyacids, wherein the unsaturation results largely from an unsaturated diacid or anhydride such as maleic acid, maleic anhydride, fumaric acid and the like, or mixtures thereof.

The chain-stopped unsaturated polyesters of the present invention are characterized by low acid values, having a maximum acid value of about 20 based on solids, or non-volatile content, preferably about 0.5 to 15.

The glycols, acid(s) and/or anhydride(s), and the chain-stopping materials are charged to a suitable reaction vessel and the reaction is carried out at a temperature of about 180° to 225° C. while maintaining the temperature of the distilling vapors at the top of the column to a maximum of about 105° C. Once the desired viscosity and the acid value, depending on the end use application is reached, the reacting material is cooled to about 150° C. and then combined with styrene monomer containing inhibitors. While the resin is being added to the styrene monomer, the temperature of the batch is maintained below about 85° C. It is then further cooled to below 65° C. before carrying out further modifications, such as urethane or urethane-acrylate extensions.

In one preferred embodiment, the polyester resin can be prepared from benzoic acid, phthalic anhydride, maleic anhydride, propylene glycol and dipropylene glycol. In another preferred embodiment, the polyester resin can be prepared from benzoic acid, isophthalic acid, maleic anhydride, trimethylol propane and neopentyl glycol.

Chain-stopped unsaturated polyester resins prepared in accordance with the present invention were found to be useful as coating materials and reinforcing materials. The resins had low molecular weight, low viscosity with good cure properties, high solids content, and good water resistance which is presumed to be due to a reduction in the functional carboxyl or hydroxyl groups.

The chain-stopped polyester resins can be further modified by the addition of a diisocyanate and an hydroxy acrylate.

The polyester resins obtained in this manner have utility as artificial marble or onyx, fiber glass reinforced products, marine resins, sheet molding compounds and resin transfer molding applications.

The polyisocyanates which can be used include aliphatic, cycloaliphatic, araliphatic, aromatic and heterocyclic polyisocyanates of the type described, for example, by W. Siefken in Justus Liebigs Annalen der Chemie, 562, pages 75 to 136 (1949), for example, those corresponding to the following formula:

$$R(NCO)_n$$

wherein, R is a difunctional aliphatic, cycloaliphatic, aromatic, or araliphatic radical having from about 2 to 25 carbon atoms, preferably 4 to 15 carbon atoms, and free of any group which can react with isocyanate groups;

Suitable diisocyanates include ethylene diisocyanate; 1,4-tetramethylene diisocyanate; 1,4 and/or 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1.,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and-/or 4,4'-diisocyanate; naphthylene-1,5-diisocyanate; 1,3- and 1,4-xylylene diisocyanate, 4,4'-methylene-bis(cyclohexyl isocyanate), 4,4'-isopropyl-bis(cyclohexyl isocyanate), 1,4-cyclohexyl diisocyanate and 3-isocyanatomethyl-3,5,5-trimethylcyclohexyl isocyanate (IPDI); 1-methoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate and 4-(2-isocyanate-cyclohexyl-methyl)-phenyl isocyanate, isophorone diisocyanate, toluene diisocyanate and mixtures thereof.

It is also possible in principle to use aliphatic or aromatic diisocyanates of the type which are obtained by reacting excess diisocyanate with difunctional compounds containing hydroxyl or amine groups and which, in practical polyurethane chemistry, are referred to either as "modified isocyanates" or as "isocyanate prepolymers".

It is generally preferred to use readily available polyisocyanates such as 2,4- and 2,6-toluene diisocyanate and mixtures of these isomers; diphenylmethane diisocyanate, hexamethylene diisocyanate, dicyclohexylmethane diisocyanate and isophorone diisocyanate.

Suitable hydroxy acrylates include hydroxyethyl methacrylate, hydroxypropyl methacrylate, hydroxyethyl acrylate, hydroxypropyl acrylate and the like, and mixtures thereof. The mole ratio of NCO/OH can vary from about 0.8 to 1.0, preferably from about 0.90 to 0.95.

Urethane modified acrylates can be prepared by charging unsaturated polyester resins, hydroxy acrylates, and if necessary, styrene monomer, into a suitable reaction vessel at a temperature of about 45° to 75° C., depending on the isocyanate to be further added. A suitable catalyst such as a tin catalyst, such as dibutyl tin dilaurate can be added. The polyisocyanate is then added at a rate which controls the temperature of the reaction to about 45° to 75° C. The extent of the reaction can be monitored by an infrared spectra until no free isocyanate peak is present. This material is cooled and then promoted with conventional promoters such as cobalt octoate, dimethyl aniline and peroxide promoters such as methyl ethyl ketone peroxide to achieve proper cure.

Materials prepared using the chain-stopped polyester resins in combination with the isocyanates and hydroxyacrylates were found to have improved tensile strength, improved flexural strength, and excellent improvement in water boil resistance and thermal shock properties. The materials also have good color properties and can be easily fabricated by conventional unsaturated resin technology. These materials are particularly suitable for onyx and marble resins, gel coat resins and bowling ball resins.

The following specific examples show preparation of materials according to the invention. All parts and percentages are by weight unless otherwise noted.

EXAMPLE 1

0.85 moles propylene glycol, 0.2 moles dipropylene glycol, 0.51 moles phthalic anhydride, 0.41 moles maleic anhydride and 0.08 moles benzoic acid were charged to a 5 liter, 4 necked flask equipped with a heating mantle, stirrer, thermometer, inert gas inlet tube, and a vacuum jacketed fractionating column filled with glass helices. A still head with thermometer and take-off condenser was mounted on the top of the fractionating column. The temperature of the reaction mixture was raised gradually to 180° C. and held for 2 hours and then increased to 200° C. The reaction was continued to an acid value of 9 at 67% non-volatiles (NV) in styrene monomer. The temperature of the distilling vapors at the top of the column was maintained below 105° C. The Gardner viscosity of the resin was R-S.

Clear resin castings were made by pouring pre-promoted resins, catalyzed with 1.25% methyl ethyl ketone peroxide between two glass plates measuring 12×12 inches and spaced with ⅛ inch metal shims. The castings were allowed to cure at room temperature overnight and then post-cured at 150° F. for four hours.

Panels measuring 5×2" were cut from the clear castings for water boil testing. The test specimens were suspended in a 2 liter cylindrical reaction vessel fitted with a heating mantle and a total condenser to reduce water evaporation. The vessel was filled with distilled water to cover all suspended test specimens and maintained at 99° to 101° F. The samples were checked at 50 and 100 hrs for blistering and cracking.

This resin had better blister resistance to water at 100° C. after 100 hours of immersion and less water absorption than similar resins prepared without the benzoic acid chain stopper. Physical testing of this resin on a ¼ inch casting cured with methyl ethyl ketone peroxide gave 15375 psi flexural strength and 7390 psi tensile strength.

EXAMPLES 2, 3 and 4

The procedure of Example 1 was repeated with different components in varying amounts. In the case of Example 3, the benzoic acid chain stopper was omitted. Data for the constituency of each example is tabulated in Table 1, which follows, as well as the results of various physical tests on clear coatings in accordance with the following ASTM test methods:

| Physical Test | ASTM Method |
|---|---|
| Barcol Hardness | D-2583 |
| Heat Distortion Temperature (HDT) | D-648 |
| Flexural Strength & Modulus | D-790 |
| Tensile Strength, Modulus & Elongation | D-638 |
| Water Absorption | D-570 |

All resins with chain stoppers had better blister resistance to water at 100° C. after 100 hours of immersion than similar resins prepared without benzoic acid. These resins also had lower viscosities, lower water absorption, and better flexural strength and tensile strength.

All resins were promoted with 0.05 weight % of 12% cobalt octoate, 0.05 weight % of 15% potassium octoate and 0.05 weight % of 2,4-pentanedione. The resins were catalysed with 1.25% methyl ethyl ketone peroxide for making castings.

TABLE 1

| EFFECT OF CHAIN-STOP MODIFICATION | | | | |
|---|---|---|---|---|
| Component | Example 1 | Example 2 | Example 3 | Example 4 |
| Propylene glycol | 0.85 | 0.9 | 1.05 | 1.05 |
| Trimethylol propane | 0.20 | 0.2 | 0.2 | 0.15 |
| Phthalic anhydride | 0.51 | — | — | — |
| Isophthalic acid | — | 0.2 | 0.3 | 0.2 |
| Maleic anhydride | 0.41 | 0.6 | 0.6 | 0.6 |
| Benzoic acid | 0.08 | 0.2 | — | 0.15 |
| Physical Properties | | | | |
| Non-volatiles (NV) | 66.6 | 65.5 | 67.3 | 66.1 |
| Acid number based on NV | 13.4 | 8.1 | 6.6 | 7.9 |
| Gardner viscosity | R-S | R-S | W | L-M |
| Brookfield viscosity (cps) (LVT #3/60 RPM) | 650 | 663 | 1400 | 355 |
| Barcol hardness | 46 | 22 | 25 | 21 |
| Heat deflection temp. °C. | 51 | 54 | 51 | 59 |
| Flexural Strength, psi | 15375 | 11810 | 9885 | 11220 |

TABLE 1-continued

EFFECT OF CHAIN-STOP MODIFICATION

| Component | Example 1 | Example 2 | Example 3 | Example 4 |
|---|---|---|---|---|
| Flexural Modulus | 4.82 | 3.14 | 2.54 | 3.09 |
| Tensile Strength, psi | 7390 | 6435 | 5465 | 6675 |
| Tensile Modulus | 5.14 | 3.41 | 2.86 | 3.41 |
| % Elongation to break | 1.6 | 3.4 | 4.9 | 4.6 |
| % Water Abs. 2 hr/212° F. | 0.907 | 1.3495 | 2.0343 | 1.5208 |
| % Water Abs. 24 hr/75° F. | 0.099 | 0.2696 | 0.533 | 0.2931 |

EXAMPLE 5

80% by weight of the chain stopped resin prepared in Example 1, and 10% by weight of hydroxyethyl methacrylate, and 0.1% dibutyltin dilaurate were charged into a 5 liter 4-neck flask with an attached heating mantle and stirrer. The temperature was maintained at 65° C. throughout the reaction. 10% by weight of isophorone diisocyanate was added continuously to the flask over a period of 1 hour with continuous stirring. The extent of the reaction was monitored by an infrared spectra until no free isocyanate peak was present.

This material at 70.5% NV (Gardner viscosity V-W) gave 18760 psi flexural strength and 8505 psi tensile strength on ¼ inch castings. The material was further diluted with styrene monomer to 61% NV (Gardner viscosity G) and resulted in 19840 psi flexural strength and 9130 psi tensile strength. At 54.7% NV (Gardner viscosity B-C) it resulted in 18930 psi flexural strength and 9550 psi tensile strength. Flexural strength was determined in accordance with ASTM D-790. Tensile strength was determined in accordance with ASTM-D-638.

This resin showed excellent physical property retention of flexural and tensile strength from 70% NV to 54% NV. It also had excellent water boil resistance to blistering. Onyx and marble sinks made from this resin gave exceptional thermal shock cycles.

A thermal shock test was carried out on marble sinks which were made with 25% resin and 75% calcium carbonate. These resins were promoted with 0.05 weight % of 12% cobalt octoate, 0.05 weight % of 15% potassium octoate and 0.05 weight % of 2,4-pentanedione and cured with methyl ethyl ketone peroxide catalyst. The sinks were of uniform thickness of ½ inch without overflow lines, and were tested as per the modified American National Standard Institute ANSI Z124.3 test.

In this test, the sink was heated with water at a temperature of 172°-178° F. flowing at a rate of 2 gallons per minute for 1.5 minutes. The sink was then allowed to drain for 30 seconds, followed immediately with cold water at 42°-48° F. flowing at the same rate for 1.5 minutes. Again, the sink was allowed to drain for 30 seconds. This sequence comprised one complete cycle with a total time of 4 minutes. In all cases, sinks were subjected to continuous repetitive cycles of hot and cold water flow until cracks were seen in the resin matrix forming the sink. When the first cracks were observed, the total number of cycles the sink had undergone to that point was noted as the "cycles to failure". Data for a conventional orthophalic resin matrix, in comparison with the resin matrix of Example 5 is shown in Table 2, which follows.

TABLE 2

| Resin Matrix | Cycles to failure |
|---|---|
| Polylite 32146 TM (Reichhold Chemicals, Inc.; orthophthalic resin) | 422 |
| Example 5 resin (@61% NV) | >4936 |
| Example 5 resin (@54.7% NV) | >4952 |

This material was also found to give good resin transfer moldings due to its low viscosity and excellent physical properties.

The inventive chain-stopped polyester resin can also be modified by adding a diisocyanate, an hydroxyacrylate and a dicyclopentadiene based unsaturated polyester resin. The material obtained has utility for marine applications.

EXAMPLE 6

36% by weight of a dicyclopentadiene based unsaturated polyester resin (Polylite 44383, TM Reichhold Chemicals, Inc.) with a Gardner viscosity of G-H at 67% NV in styrene monomer, and with an acid value of 20 max on solution was mixed with 44% by weight of the chain stopped polyester of Example 1, 12% by weight hydroxyethyl methacrylate, 4% by weight styrene and 0.1% by weight dibutyltin dilaurate. The urethane reaction was carried out as in Example 5, with 4% by weight toluene diisocyanate. The resulting resin solution was adjusted to 56% NV and promoted with 0.05 weight % of 12% cobalt octoate, 0.05 weight % of 15% potassium octoate and 0.05 weight % of 2,4-pentanedione and thixed with 0.7 weight % fumed silica.

Materials prepared by this process were found to have excellent water boil resistance and low surface profile characteristics as well as improved tensile strength and high impact resistance. These materials are particularly suitable as marine resins.

Castings made from this resin were immersed in boiling water for 100 hours without developing any blisters. The castings had a flexural strength of 16740 psi and a tensile strength of 9020 psi before the water boil. The castings had retention properties of 57.8% in flexural modulus and 60.6% in tensile strength after the 100 hour water boil test.

The surface profile characteristics were evaluated by preparing laminates on black gel coated glass panels with 65% pre-promoted resin and 35% glass fibers comprising 2 ply 1.5 ounce chopped strand mat and 2 ply 24 ounce woven roving.

The resin was catalyzed with methyl ethyl ketone peroxide. The laminates were cured at 75° F. overnight. The next day the laminates were removed from the glass plates and observed visually for surface smoothness on the gel coat side. These panels were then exposed outdoors for 24 hours. Laminates prepared from the resins of Example 6 gave much better surfaces in comparison to conventional orthophthalic resins on the basis of visual examination.

The chain-stopped polyester resins prepared in accordance with the invention have utility in a wide variety of applications. They are unsaturated resins of low molecular weight and low viscosity. They offer improved hydrolytic stability compared with conventional resins of similar viscosity due to a reduction in the functional carboxyl and hydroxyl groups.

What is claimed is:

1. In a process for preparing low molecular weight unsaturated polyester resins by condensing at least one polyhydric alcohol with at least one unsaturated dicarboxylic acid or anhydride, the improvement which comprises chain-stopping the condensation reaction with a monofunctional alcohol or acid to produce an unsaturated polyester resin having a molecular weight varying from about 450 to 2500.

2. The process of claim 1, wherein the polyhydric alcohol is selected from the group consisting of ethylene glycol, propylene glycol, diethylene glycol, dipropylene glycol, trimethylol propane, trimethylol ethane, neopentyl glycol, pentaerythritol, glycerine, triethylene glycol, cyclohexane dimethanol, hexane diol, butylene glycol, and mixtures thereof.

3. The process of claim 1, wherein the unsaturated carboxylic acid or anhydride is selected from the group consisting of maleic acid, maleic anhydride, fumaric acid, and mixtures thereof.

4. The process of claim 1, wherein the chain stopping monofunctional acid or alcohol is not ethylenically unsaturated.

5. The process of claim 1, wherein the functionality of the chain stopping monofunctional acid or alcohol is less than 2.

6. The process of claim 1, wherein the chain stopped unsaturated polyesters have a maximum acid value of about 20.

7. The process of claim 1, wherein the monofunctional alcohol or acid is selected from the group consisting of benzoic acid, benzyl alcohol, 2-ethylhexanol, cyclohexanol and mixtures thereof.

8. The process of claim 1, wherein the condensation reaction is chain-stopped with a monofunctional alcohol by replacing terminal carboxyl groups on the polyester with hydrocarbon groups.

9. The process of claim 1, wherein the condensation reaction is chain-stopped with a monofunctional acid by replacing terminal hydroxy groups on the polyester with hydrocarbon groups.

10. The process of claim 1, wherein the polyhydric alcohol is used in amounts varying from about 100 to 225 mole % of the total acid mole composition.

11. The process of claim 1, wherein the carboxylic acid or anhydride is used in an amount varying from about 50 to 98 mole % of the total acid composition.

12. The process of claim 1, wherein the monofunctional alcohol or acid is used in amounts varying from about 2 to 50 mole % of the total acid or total polyhydric alcohols.

13. The process of claim 1, carried out at a temperature of about 160° to 220° C.

14. The process of claim 1, further comprising reacting the low molecular weight polyester resin with at least one diisocyanate and at least one hydroxy terminated acrylate.

15. The process of claim 1, further comprising reacting the low molecular weight polyester resin with at least one isocyanate, and at least one hydroxy terminated acrylate and a dicyclopentadiene terminated hydroxy polyester.

16. The chain-stopped unsaturated polyester resin product formed by the process of claim 1.

17. The chain-stopped unsaturated polyester resin product formed by the process of claim 14.

18. The chain-stopped unsaturated polyester resin product formed by the process of claim 15.

* * * * *